July 20, 1954
P. R. HAMAKER
2,683,951
ANIMAL TRAP
Filed July 31, 1952
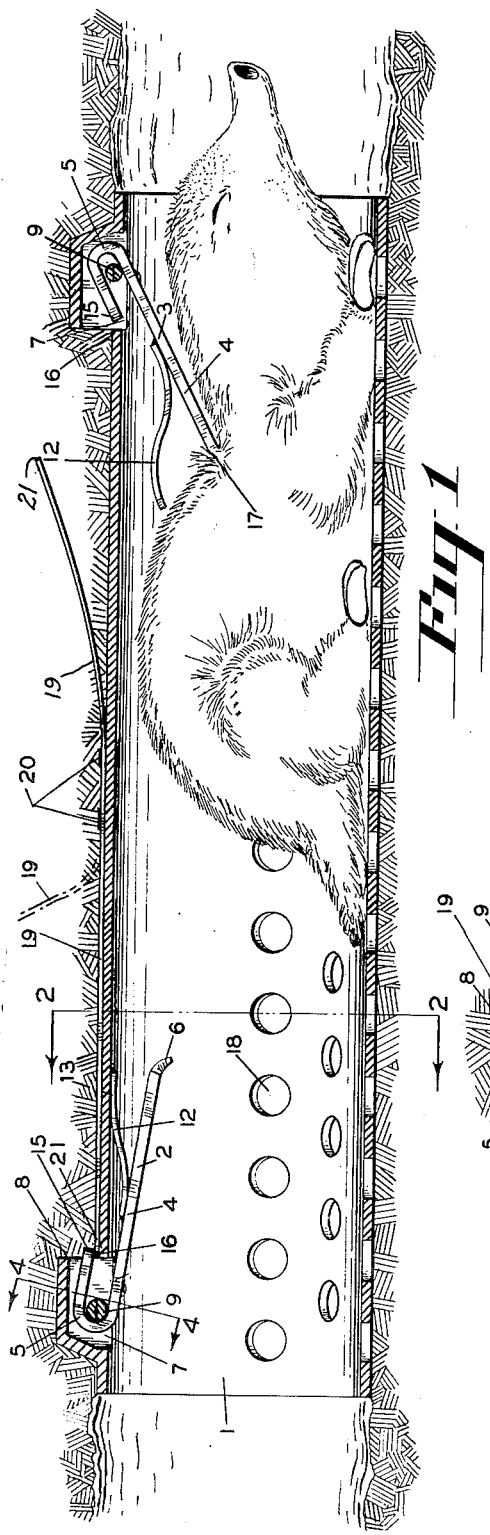
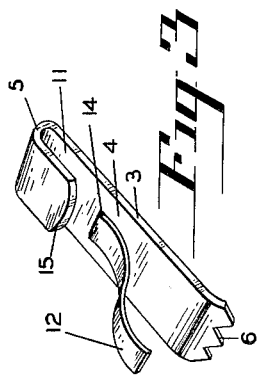
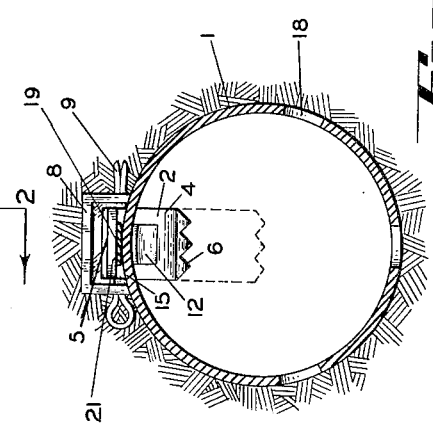
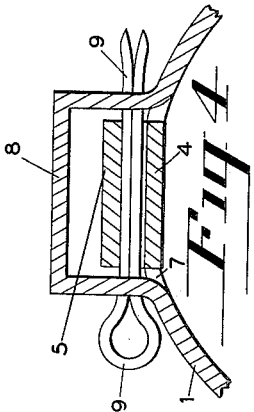
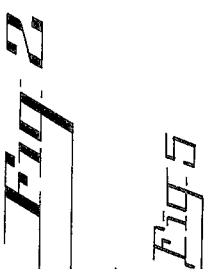
INVENTOR.
PAUL R. HAMAKER
BY
ATTY.

Patented July 20, 1954

2,683,951

UNITED STATES PATENT OFFICE 2,683,951

ANIMAL TRAP

Paul R. Hamaker, Portland, Oreg.

Application July 31, 1952, Serial No. 301,829

4 Claims. (Cl. 43—61)

This invention relates to improvement in animal traps and is particularly adapted for the trapping of moles and the like.

The primary object of the invention is to provide a tubular body that can be located within the runway of the animal, the said tubular body having specially constructed claws mounted therein adapted to arrest the movement of the animal on its way through the tubular body of the trap.

Another outstanding feature of my new and improved animal trap is its simplicity of construction, making it an easy matter to set the trap without danger to the operator.

Another object of the invention is the provision of a trap that is light of weight and that can be carried easily by the trapper on his trap line, allowing him to carry a great number of traps.

My new and improved animal trap can be used as a trap for moles or for large animals.

These and other incidental objects will be apparent in the drawings, specification and claims.

Referring to the drawings:

Figure 1 is a central longitudinal sectional view of my new and improved trap located within a mole runway, showing one animal engaging bar in latched operating position and another in unlatched position trapping an animal.

Figure 2 is a transverse sectional view of the trap, taken on line 2—2 of Figure 1.

Figure 3 is a perspective view of the trapping claw removed from the trap.

Figure 4 is an enlarged fragmentary sectional view, taken on line 4—4 in Figure 1.

Figure 5 illustrates my new and improved animal trap within a runway and indicating that an animal has been trapped.

Referring more specifically to the drawings:

My new and improved animal trap consists of a relatively thin tube 1, adapted to correspond to the size of the animal being trapped. Located on either end of the tube are bars 2 and 3. Each bar is bent at one end to form a return bend 5 and at the other end each bar is bent slightly and serrated to form claws 6. Openings 7 are formed within each end of the tube 1 and have protecting hoods 8, the hoods being open at one end to form means for access to the bars in setting the trap.

The bars 2 and 3 are mounted on the pivot pins 9 within the hoods 8, as illustrated in Figures 1 and 2. The return bends form slots through which the pins 9 pass, thus permitting a sliding movement of the bars. Referring to Figure 1 particularly, the bar 2 is illustrated in set or cocked position. The spring 12 exerts a downward pressure on the bar by its contact at the point 13, the spring being fixedly secured to the bar by any suitable means, as welding at 14. A flat spring 19 is fixedly secured at 20 to the exterior of tube 1 and extends either way beyond this point, its ends 21 registerable with the shoulder 16 of the opening 7 on either end of the tube, as best illustrated in Figure 1.

When the trap is set, the bar is directed to the position shown at the left end portion of Figure 1, that is to say the bar is slid towards the shoulder 16 and over the end 21 of the spring 19. The end of the return bend 5 forms a projection 15 which engages the shoulder 16 and the end 21 of the spring 19, holding the bar 2 in the position shown at the left of the drawing.

Referring to the right portion of Figure 1, an animal is shown trapped or prevented from going forward by the claws 6 of the bar 3, engaging the animal's back at 17. The projection 15 of the return bend 5 of the unlatched bar having been released from the end of shoulder 16 and the spring 19, the free end of the spring 19 flips up and thus disturbs the surrounding earth which indicates that an animal has been trapped. Openings or holes 18 are punched or formed through the tube 1, the object of which is to afford traction for the animal within the tube and close contact with the soil under the tube.

I will now describe the operation of my new and improved animal trap. When the animal entered the tube 1, Figure 1, he passed underneath the claws 6 of the bar 2 without tripping the same, but on making further progress through the tube the animal engaged the teeth 6 of the bar 3, sliding the same, and forcing the projection 15 of the return bend 5 off the end 21 of the spring 19 and the shoulder 16, allowing the bar to take the position shown, thus preventing further forward movement of the animal.

In the event the animal attempts to back up in the tube he will engage the claws 6 of the bar 2 tripping the same, thereby completely trapping himself within the tube 1. When the end 21 of the spring 19 was released from the projection 15 of the bar 3, it permitted the said spring 19 to move up through the soil above the runway indicating that the trap has been sprung as noted above.

In order to release the animal from the trap, the pivot pin 9 can be removed allowing the bars 2 and 3 to be released therefrom, after which the animal can be removed from the tube.

In the setting of the trap the bars are replaced and the operator then reaches in with his fingers from the end of the tube, raising the bar to the position shown at the left hand of Figure 1, forcing the projection 15 up over the end 21 of the spring 19, which is being held down against the shoulder 16 by the operator's opposite hand. The spring 12 will then force the bar towards the center of the tube causing the projection 15 to remain on the end of the spring and the shoulder 16, until the animal engages the claws 6, forcing the projection off the said spring and shoulder.

What I claim is:

1. An animal trap comprising a tube having an opening in its wall, a pivot pin extending across the opening, a bar slidably mounted on the pin and tiltable in the tube, the free end of the bar having claws, the opposite end of the bar having a lug projecting in the direction of and spaced from body portion of said bar, the wall adjacent the opening forming a shoulder adapted to support the projecting lug to retain the bar in a set position, and a spring between the wall of the tube and the bar, whereby when an animal passing through the tube contacts the free end of the bar the latter is slid on the pivot and disengages the projection from the shoulder whereby the spring tilts the bar on its pivot and its claws engage the animal.

2. An animal trap comprising a tube having a hood, a pivot extending across and mounted in the hood, a bar having a U-shaped bend at one end providing a slot adapted to receive the pivot and pivotally and slidably mount the bar on the pivot, said bar extending within the tube and having claws at the end opposite the bent end, said tube having a shoulder adjacent said hood, the free leg of the U-shaped bend being adapted to engage said shoulder when the bar is swung and slid on the pivot to set position, and a spring interposed between the tube and the bar and biasing the claw end of said bar to trapping position, whereby when an animal passes through the tube and engages the claw end of the bar the latter will be slid on the pivot and disengage the free leg of the bent end from the shoulder and the spring will thrust the claw end of the bar down in the tube and engage and trap the animal.

3. An animal trap as defined in claim 2, wherein said hood has an opening on one side and said shoulder is adjacent said opening, and a flat spring secured on the outer surface of the tube with its free end adapted to extend over the shoulder and on which the free leg of the U-shaped bend is supported when the bar is in set position, the free end of the flat spring being tensioned upwardly to serve as a signal when an animal has released the bar.

4. An animal trap comprising a tube formed at opposite ends with hoods and shoulders respectively adjacent said hoods, pivots extending across said hoods, bars having U-shaped bends at one end providing slots adapted to receive said pivots and pivotally and slidably mounting the bars on the pivots, said bars extending toward each other within the tube and having claws at the ends opposite the bent ends thereof, the free legs of the U-shaped bends being adapted to engage said shoulders when the bars are swung and slid on said pivots to set position, and springs interposed between the tube and said bars and biasing the claw ends of said bars to trapping position, whereby an animal passing through the tube will engage the claw end of one of the bars and slide the bar extending opposite the animal's direction of travel and disengage the free leg of the bent end of said bar from the shoulder and the spring will thrust the claw end of said bar toward and trap the animal.

References Cited in the file of this patent

UNITED STATES PATENTS

| Number | Name | Date |
|---|---|---|
| 253,907 | Andre | Feb. 21, 1882 |
| 1,372,927 | Barber | Mar. 29, 1921 |
| 1,996,872 | Long | Apr. 9, 1935 |